B. F. LUKE & C. L. ALLEN.
CULTIVATOR.
APPLICATION FILED APR. 7, 1911.
1,008,837.
Patented Nov. 14, 1911.
3 SHEETS—SHEET 2.
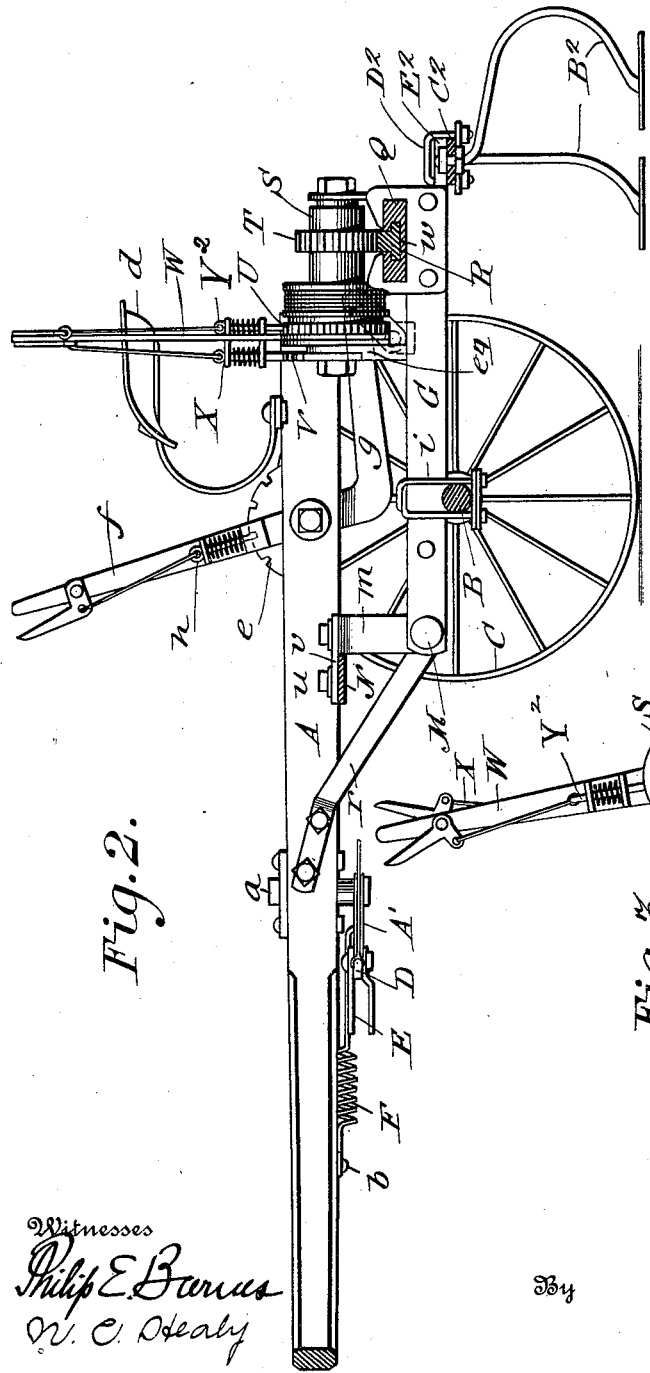
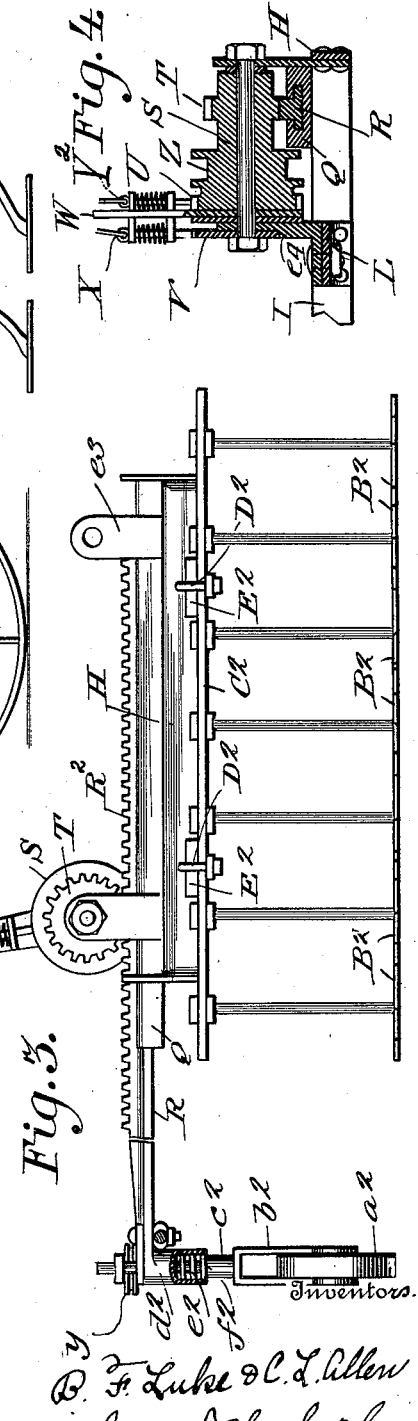

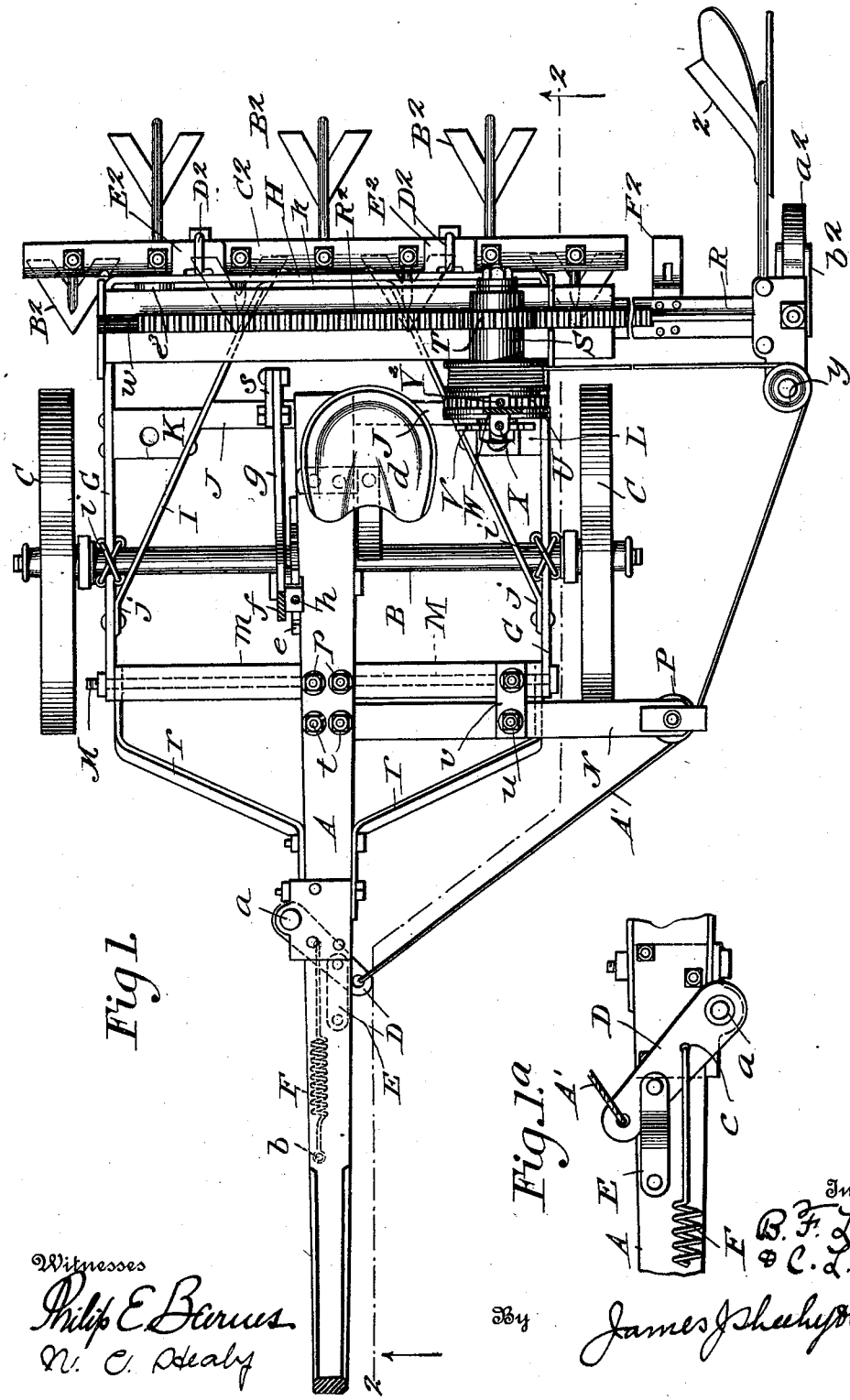

B. F. LUKE & C. L. ALLEN.
CULTIVATOR.
APPLICATION FILED APR. 7, 1911.
1,008,837.
Patented Nov. 14, 1911.
3 SHEETS—SHEET 3.
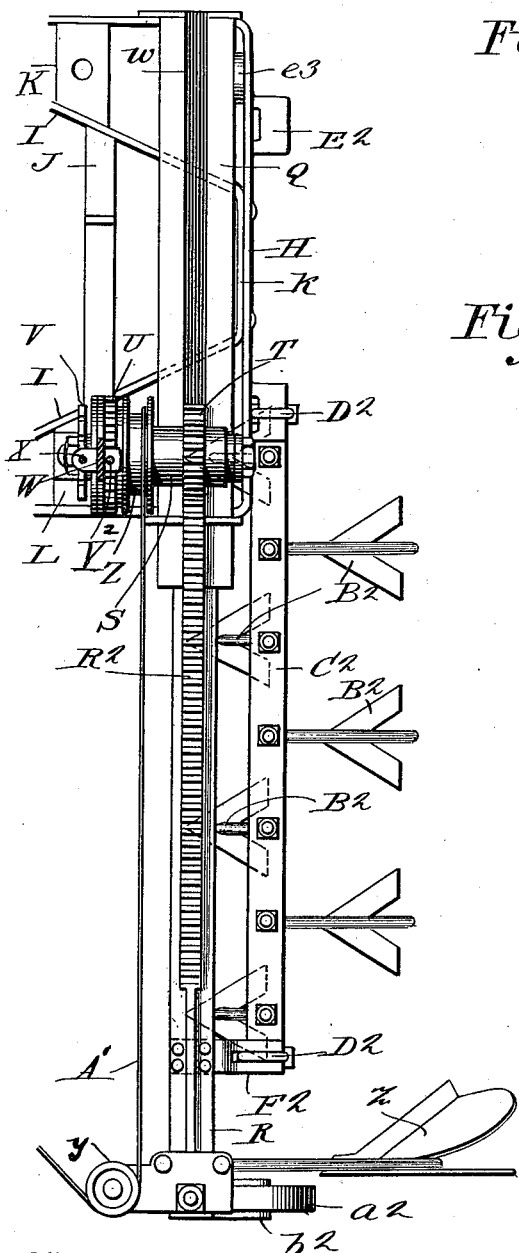
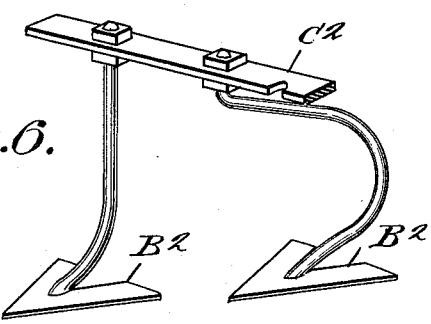
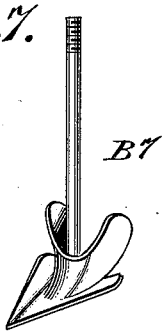
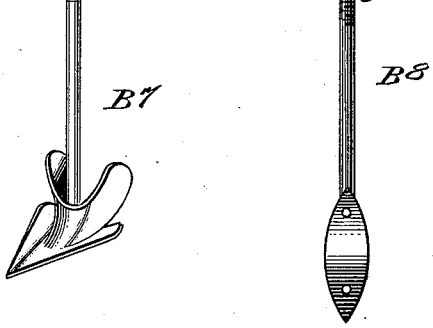
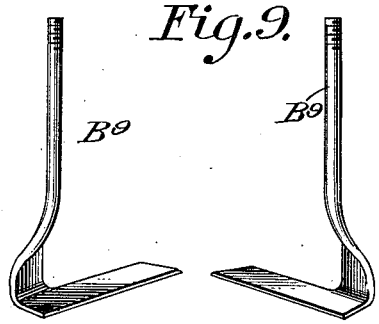
Witnesses
Philip E. Barnes
N. C. Healy
Inventor
B. F. Luke &
C. L. Allen
By James J. Sheehy & Co.
Attorney

UNITED STATES PATENT OFFICE.

BENJAMIN F. LUKE AND CHARLES L. ALLEN, OF ORANGEVILLE, UTAH, ASSIGNORS TO B. F. LUKE COMPANY, A CORPORATION OF UTAH.

CULTIVATOR.

1,008,837. Specification of Letters Patent. Patented Nov. 14, 1911.

Application filed April 7, 1911. Serial No. 619,567.

*To all whom it may concern:*

Be it known that we, BENJAMIN F. LUKE and CHARLES L. ALLEN, citizens of the United States, residing at Orangeville, in the county of Emery and State of Utah, have invented new and useful Improvements in Cultivators, of which the following is a specification.

Our present invention pertains to cultivators; and it consists in the peculiar and advantageous cultivator, hereinafter described and claimed, designed more especially for working the ground adjacent the trunks of orchard trees where the low hanging limbs interfere with the use of an ordinary cultivator.

In the drawings, forming part of this specification: Figure 1 is a plan view of a cultivator constituting one embodiment of our invention. Fig. 1ª is a detail inverted plan illustrating the lever on the underside of the pole, which lever is designed for the attachment of draft animals, and also illustrating certain parts connected to said lever. Fig. 2 is a vertical longitudinal section taken on the line 2—2 of Fig. 1, looking in the direction indicated by arrow. Fig. 3 is a detail rear elevation, partly in section, and showing the attachment of a group of weeders to the rear portion of the main frame. Fig. 4 is a detail longitudinal vertical section illustrating the means for extending and retracting the plow-carrying bar of the machine. Fig. 5 is a detail plan illustrating the manner in which a group of weeders or other cultivating blades may be attached both to the outer portion of the plow-carrying bar and the main frame of the machine. Fig. 6 is a detail perspective showing two of the weeders and the bar by which the group of weeders is carried. Fig. 7 is a perspective illustrating a corrugator, a number of which may be used in lieu of the weeders when occasion demands. Fig. 8 is an elevation showing another cultivator blade, a plurality of which may be used in lieu of the weeders. Fig. 9 comprises disconnected perspective views of still other blades adapted to be used in lieu of the weeders.

Referring by letter to the said drawings, and more particularly to Figs. 1 to 4 thereof: A is the tongue of our novel machine. B is the axle upon the end portions of which ground wheels C are loosely mounted. D is a horizontally swinging lever, pivotally connected at $a$ to a pin carried at one side of the tongue A and arranged to swing horizontally in a plane below the tongue. E is a clevis pivotally connected to said lever D and designed to carry a double-tree (not illustrated), and F is a tractile spring, connected at $b$ to the underside of the tongue A, and at $c$ to the lever D, and having a tendency to draw the free end of the said lever forward. It will also be seen by comparison of Figs. 1 and 2 that the tongue A is equipped with a driver's seat $d$, a segmental rack $e$, and a vertically swinging hand lever $f$, which hand lever is provided on its lower arm with a rearwardly extending portion $g$, Fig. 2, and is equipped on its upper arm with a detent $h$, designed to coöperate with the segmental rack in adjustably fixing the lever in various positions. Fixed by shackles $i$, or other suitable means on the axle B, are the side bars G of the main frame of the machine. The rear ends of the said side bars G are connected by a cross-bar H fixed thereto, and a brace I has its ends $j$ connected to the side bars G and also has an intermediate portion K connected to the rear cross-bar H, the connections being rigid ones, and the purpose of the brace, as its name imports, is to lend increased rigidity and strength to the main frame as a whole. The arms of the said brace I are connected together by a cross-bar J, and it will also be noted that one of the arms is connected to the adjacent side bar G by a fixed transverse bar K, while the other arm of the bail is connected to the adjacent side bar G by a transverse bar L. The forward ends of the side bars G are connected through the medium of a transverse rod M, and said ends are also connected to the depending portions $m$ of a cross-bar $n$, which cross-bar is fixedly connected by bolts $p$ to the underside of the tongue A. Between the cross-rod M, at points adjacent the depending portions $m$ of the bar $n$, and the tongue, are interposed braces $r$. The rearwardly directed portion $g$ on the lower arm of the hand lever $f$ is connected through a link $s$ with the transverse portion J of the main frame, and hence it will be manifest that when the upper arm of lever $f$ is thrown forward the rear portion of the main frame will be raised, while when the upper arm of said lever $f$ is moved rearward, the rear portion of the main frame will be depressed or moved downward. Fixed by bolts $t$ to the tongue A and by a bolt $u$ to an arm $v$ on the cross-bar $n$, is a bar N which extends outward to a point beyond one of the ground wheels C, and is provided at its outer end with a horizontally disposed sheave P, for a purpose hereinafter set forth. Suitably fixed on the rear portion of the described main frame is a transverse bar Q in which is a guideway $w$ of inverted T-form in cross-section, as best shown in Fig. 2. The said guideway $w$ is designed to receive and guide the correspondingly-shaped extension bar R of our invention, in the direction of its length, and transversely or in the direction of the width of the machine. On its upper portion the said extension bar R is provided with a rack $R^2$ which extends through a portion of its length, and at its outer end the said extension bar is equipped with a horizontal sheave $y$, a plow $z$, and a supporting wheel $a^2$; the said supporting wheel being carried by a frame $b^2$ having a stem $c^2$ which extends up through and is movable vertically and about its axis in a housing $d^2$ on the extension bar, and a coiled spring $e^2$ being arranged in the housing $d^2$, and interposed between an abutment $f^2$ on stem $c^2$ and the upper end of the housing. It will be gathered from this that the spring is adapted to carry the weight of the extension bar R and still permit of the plow being placed to move through the ground; also, that the stem $c^2$ is free to turn about its axis so as to enable the wheel to assume the correct position when the machine is drawn forward after endwise adjustment of the bar R.

For the purpose of adjusting the bar R in the direction of its length and adjustably fixing the said bar in various positions, we provide the means best shown in Fig. 4, which means comprises a suitably supported drum S having a pinion T intermeshed with the rack R, and also having teeth U, a fixed segmental rack V, a hand lever W, suitably supported and movable independently of the drum S, a detent X carried by the lever and adapted to engage the segmental rack V, and a detent $Y^2$ also carried by the lever and adapted to engage the teeth U of the drum S. When the detent X is held out of engagement with the segmental rack V, and the lever W is moved in one direction with its detent $Y^2$ in engagement with the teeth U, the drum S and the pinion T will be rotated, and the bar R will be moved endwise outward or inward, according to the direction of the said movement of the lever W. It will also be manifest that after a movement of the lever W in one direction for the purpose stated, its detent $Y^2$ can be disengaged from the teeth U, and then after the lever is moved back to its original position and its detent $Y^2$ is again put in engagement with teeth U, a second movement of the lever in the first-named direction will result in further endwise movement of the bar R, outward or inward, according to the direction in which the lever W is moved to rotate the drum. Then when the detent X is permitted to engage the segmental rack V, the drum S and its appurtenances will be locked against rotation and the extension bar R will be adjustably fixed in the position in which it is placed. At Z the drum S is provided with a circumferentially grooved portion. This grooved portion is designed to take up and pay off a cable A', preferably of wire, which is connected to the said grooved portion and extends from the lower portion thereof around the sheaves $y$ and P, and is connected to the free end of the horizontally swinging lever D hereinbefore referred to. Being connected to the drum S, it follows that when the said drum S is rotated to move the extension bar R outward, the cable A' will be fed off the circumferentially grooved portion Z to an extent commensurate with the extension of bar R, while when the drum S is rotated to retract or draw the bar R inward, a corresponding quantity of the cable A' will be taken up on the drum or circumferentially grooved portion Z of the drum. Thus it will be manifest that at all times the cable A' will take strain off the extension bar R, and by reason of the connection of the said cable to the lever D adapted for the attachment of the draft animals, it will also be manifest that the cable will equalize the draft, so that the outer portion of the extension bar R will be drawn forward as well as the longitudinal central portion and other portions of the machine.

In the practical operation of our novel machine the plow $z$ may be used alone or may be used at the same time with a plurality of suitable cultivator blades, which latter may be connected to the rear portion of the main frame of the machine alone, as shown in Figs. 1, 2 and 3, or else may be connected at one end to the extension bar R and at the other end to the rear portion of the main frame as shown in Fig. 5. The cultivator blades referred to are shown in Figs. 1, 2, 3, 5 and 6 as weeders. In the first mentioned instance the weeders are carried by a body bar $C^2$, and this latter is connected by shackles $D^2$ to lugs $E^2$, on the rear bar H of the main frame. In the second-named instance the body bar $C^2$ carrying the weeders $B^2$ is connected by a shackle $D^2$ to one of the lugs $E^2$ on the frame bar H, this adjacent one end of the bar $C^2$, and the other end of the bar $C^2$ is connected by a shackle $D^2$ to a lug $F^2$ on the outer portion of the extension bar R. When the cultivator blades B² are carried in the manner last described, and as shown in Fig. 5, the said cultivator blades in common with the plow z, will pass freely under the low hanging branches of orchard trees.

As before stated, the cultivator blades shown in Figs. 1, 2, 3 and 5, are in the form of weeders, and two of the said cultivator blades are shown in perspective in Fig. 6. We would have it understood, however, that in both of the instances mentioned the bar C² may be equipped with either corrugators B⁷, such as shown in Fig. 7, shovels B⁸, such as shown in Fig. 8, or blades B⁹, such as shown in Fig. 9, in lieu of the weeders B². In fact the cultivator blades used on the bar C² may be of any description compatible with the purpose of our invention without involving departure from the scope of the invention as claimed.

When the cultivator attachment is employed in the manner shown in Fig. 5, the bar C² will of course be attached after the extension bar R is placed in the position desired, with respect to the main frame of the machine. When, however, the bar bearing the cultivator or ground-working blades is connected in the manner shown in Figs. 1, 2 and 3, the said bar and the blades carried thereby will in no way interfere with the adjustment of the extension bar R as occasion demands.

While we have shown and described certain forms of our invention, it is to be understood that we are not limited to the details or the form or relative arrangement of the parts disclosed, but that modifications may be made therein, without departing from the spirit thereof. For instance the bar R may be changed and made to extend from the right-hand side of the main frame; the drum S, and pinion T and their appurtenances being in that case mounted near the right-hand side of the main frame, between the auxiliary standard e³, Figs. 1 and 3, and the standard e⁴, the latter having been shifted from the position shown to the right-hand apertured bar K, Fig. 1. Therefore the term "one side" in our claims is intended to comprehend either side.

Having described our invention, what we claim and desire to secure by Letters-Patent, is:

1. In a cultivator, the combination of a frame, a horizontally swinging lever connected therewith and adapted for the connection of draft animals, a sheave connected with the frame and disposed at one side thereof, an extension bar bearing a rack and adjustable in the direction of the width of the frame, and beyond the said side thereof, ground-working means carried by said bar, a sheave also carried by the bar, a pinion mounted on the main frame and intermeshed with the rack of the extension bar, a drum fixed with respect to and rotatable with said pinion, a cable connected to said lever and passed around the sheaves on the frame and extension bar, respectively, and adapted to be wound on the drum as the extension bar is retracted and fed off the drum as the extension bar is moved outward, a circular series of teeth fixed with respect to the pinion and the drum, a fixed rack, and a hand lever movable independently of the pinion and drum and having a detent to engage the said circular series of teeth and also having a detent to engage the said rack.

2. In a cultivator, the combination of a frame, a horizontally swinging lever connected therewith and adapted for the connection of draft means, a sheave connected with the frame and disposed at one side thereof, an extension bar bearing a rack and adjustable in the direction of the width of the frame and beyond the said side thereof, ground-working means carried by said bar, a sheave also carried by the bar, a pinion mounted on the main frame and intermeshed with the rack of the extension bar, a drum fixed to and rotatable with said pinion, a cable connected to said lever and passed around the sheaves on the frame and extension bar, respectively, and adapted to be wound on the drum as the extension bar is retracted and fed off the drum as the extension bar is moved outward, means for rotating the pinion and drum, and means for adjustably fixing said pinion and drum.

3. In a cultivator, the combination of a frame, wheels supporting the same, a transverse bar fixed on the rear portion of the frame and having a groove or channel of inverted T-form in cross-section in its upper side, a tongue fixed to the frame, a horizontally swinging lever arranged below the tongue and pivoted at one end thereto, a tractile spring connected at one end to said lever and connected at its opposite end to the tongue at a point in front of the lever, an arm fixed to the forward portion of the frame and extending outward beyond one of the wheels, a sheave on said arm, an extension bar, of inverted T-form in cross-section, arranged in the said channel bar and having a rack on its upper portion, a wheeled support on which the outer portion of the extension bar is yieldingly mounted, ground-working means carried by the outer portion of the extension bar, a sheave on the outer portion of said extension bar, a pinion mounted on the main frame and intermeshed with the rack of the extension bar, a drum fixed to and rotatable with said pinion, a cable connected to the said lever on the tongue and passed around the sheaves on the frame arm and extension bar and adapted to be wound on the drum as the extension bar is retracted and fed off the drum as the extension bar is moved outward, means for rotating the pinion and drum, and means for adjustably fixing said pinion and drum.

4. In a cultivator, the combination of a frame, a horizontally swinging lever connected therewith and adapted for the connection of a draft animal or animals, an extension bar suitably guided on the rear portion of the frame and movable outward and inward at one side of the frame, ground-working means carried by said extension bar, means for moving the extension bar outward and inward, a cable connected with said lever and suitably guided on the outer portion of the extension bar, and means for taking up said cable correspondingly to the retraction of the extension bar and for feeding off said cable correspondingly to the outward adjustment of the extension bar.

5. In a cultivator, the combination of a frame, a horizontally swinging lever connected therewith and adapted for the attachment of a draft animal or animals, an extension bar suitably guided on the rear portion of the frame and movable outward and inward at one side of the frame, ground-working means carried by said extension bar, a supporting wheel connected with the outer portion of the extension bar and adapted to turn horizontally and also adapted to move vertically with respect to said bar, yielding means interposed between the bar and the wheel, means for moving the extension bar outward and inward, a cable connected with said lever and suitably guided on the outer portion of the extension bar, and means for taking up said cable correspondingly to the retraction of the extension bar and for feeding off said cable correspondingly to the outward adjustment of the extension bar.

6. In a cultivator, the combination of a frame having a transverse bar in the upper side of which is a channel, an extension bar movable outward and inward away from and toward one side of the frame and guided in said channel bar and having a rack on its upper portion, ground-working means carried by said bar, means for supporting the outer portion of the extension bar, a pinion mounted on the frame and intermeshed with the rack of the extension bar, a circular series of teeth fixed with respect to said pinion, a rack fixed on the frame, a lever movable independently of the pinion, a detent carried by said lever and arranged for engagement with said circular series of teeth, and a second detent carried by the lever and arranged for engagement with the fixed rack on the frame.

7. In a cultivator, the combination of a frame, wheels supporting the same, an extension bar guided by the frame and movable outward and inward away from and toward one side of the frame and also away from and toward the adjacent supporting wheel, ground-working means carried by said bar, adjustable draft means, means for synchronously and correspondingly adjusting the extension bar and the draft means, and means for synchronously and adjustably fixing said bar and draft means.

8. In a cultivator, the combination of a frame, an extension bar guided by the frame and movable outward and inward away from and toward one side of the same, ground-working means carried by said bar, means for adjustably fixing said bar with respect to the frame, adjustable draft means, and means for adjustably fixing said draft means in accordance with the adjustments of the extension bar.

9. In a cultivator, the combination of a frame, an extension bar carried by the frame and movable outward and inward away from and toward one side of the same, ground-working means carried by said bar, means for adjustably fixing said bar with respect to the frame, and auxiliary ground-working means arranged back of the frame and extension bar and connected at its inner end to the former and at its outer end to the latter.

10. In a cultivator, the combination of a frame, an extension bar guided by the frame and movable outward and inward away from and toward one side of the same, ground-working means carried by said bar, means for adjustably fixing said bar with respect to the frame, auxiliary ground-working means arranged back of the frame and extension bar and connected at its inner end to the former and at its outer end to the latter, adjustable draft means, and means for adjustably fixing said draft means in accordance with the adjustments of the extension bar.

In testimony whereof we have hereunto set our hands in presence of two subscribing witnesses.

BENJAMIN F. LUKE.
CHARLES L. ALLEN.

Witnesses:
C. E. LARSEN,
W. G. PEACOCK, Jr.

Copies of this patent may be obtained for five cents each, by addressing the "Commissioner of Patents, Washington, D. C."